May 22, 1956     C. B. GRADY, JR     2,747,156
INVERTER CONTROL SYSTEM
Filed Sept. 24, 1952
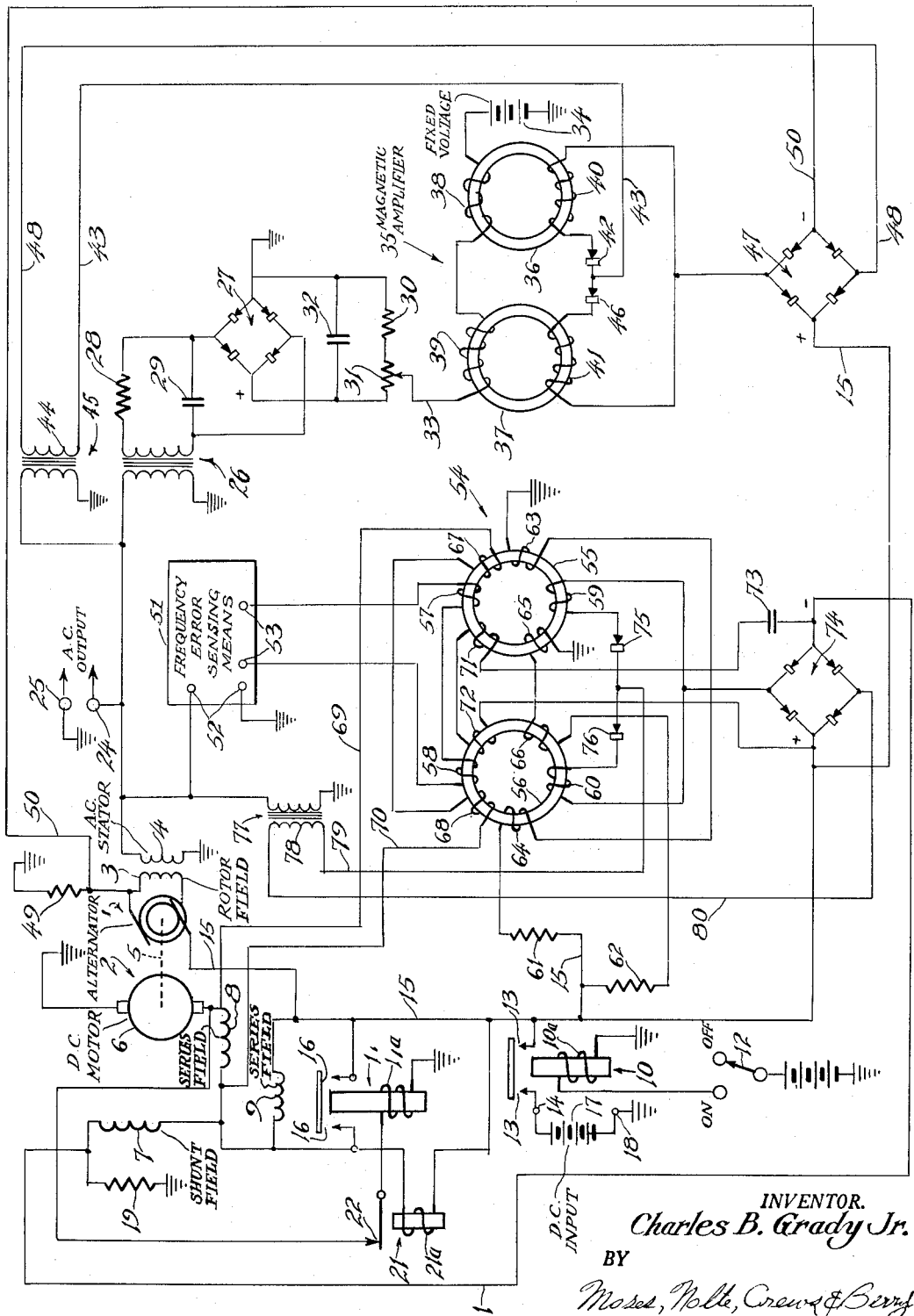
INVENTOR.
Charles B. Grady Jr.
BY
Moses, Nolte, Crews & Berry
ATTORNEYS United States Patent Office 2,747,156
Patented May 22, 1956

2,747,156

INVERTER CONTROL SYSTEM

Charles B. Grady, Jr., West Orange, N. J., assignor to The W. L. Maxson Corporation, New York, N. Y., a corporation of New York Application September 24, 1952, Serial No. 311,294

11 Claims. (Cl. 322—24)

The present invention relates to voltage and frequency regulators for inverters, and more particularly for inverters which comprise an alternator driven by a direct current motor.

The invention provides a regulator which maintains the output voltage and frequency of the driven alternator accurately controlled within precise limits by control of the alternator field excitation and by controlling the shunt field excitation of the driving motor, respectively.

An object of the invention is to provide a regulator of this character in which the regulator employs smoothly and continuously responsive control means utilizing no moving parts in the field excitation circuits as do many of the various types of conventional regulators which use vibratory moving contacts, carbon pile type variable resistors and the like.

A further object of the invention is to provide such a regulator which is suitable for use in airborne power supply equipment.

Another object of the invention is the provision of a regulator of this type which uses magnetic amplifiers for the smoothly and continuously responsive control of the voltage and frequency of the alternator, whereby incremental regulation in appreciable steps is avoided.

Still another object of the invention is to provide a regulator including degenerative feed-back for stabilization of the regulating action whereby hunting is avoided.

A further object of the invention is to provide means for adjusting the generated voltage to compensate for temperature changes which would otherwise impair the accuracy of regulation by reason of the accompanying changes in resistance of the rotating machinery and in various components of the regulator.

Another object of the invention is to provide a regulator of this character which includes means for compensating for changes in load, whereby both the output voltage and the output frequency remain constant, notwithstanding variations in the load.

Other and further objects will become apparent upon reading the following specification together with the accompanying drawing forming a part thereof.

Referring to the drawing, the single figure is a schematic circuit diagram of an embodiment of the invention.

An alternator 1 is driven by a direct current motor 2. Alternator 1 comprises a rotor having a field winding 3 to which direct current excitation is applied, the rotor being arranged to generate an alternating potential in a stator or output winding 4.

Alternator 1 is connected by suitable mechanical coupling means indicated diagrammatically by the dotted line 5 to the armature 6 of the direct current motor 2. Motor 2 is shown provided with a shunt field 7 and a series field 8, the series field 8 being connected in the usual manner to improve the speed regulation of the motor. An additional series field 9 is used only while the motor is being started being connected to increase the starting torque and to limit the armature current to a suitable value at the instant when the motor is first stared.

*Motor starting circuit*

The starting circuit of motor 2 comprises two contactors 10 and 11 shown illustratively as having normally open contacts of the double break type. The use of double break contacts improves the direct current interrupting capacities of the contactors 10 and 11.

An "on-off" control switch 11 is connected to energize the winding 10a of contactor 10 when thrown to its "on" position and to deenergize the winding 10a when thrown to its "off" position. When winding 10a is energized, contacts 13 of contactor 10 connect a direct current input terminal 14 via a conductor 15 to one of the normally open contacts 16 of contactor 11. The starting series field 9 is connected across these normally open contacts 16 and a starting current path is thereby completed from one side of a direct current source shown illustratively as a battery 17 connected to input terminal 14, through the closed contacts 13 of contactor 10, conductor 15, starting series field 9, running series field 8 and armature 6 to ground. The other side of the direct current source 17 is connected to ground at terminal 18, which completes the circuit. The shunt field 7 is also energized in multiple with the series combination of series field 8 and armature 6, the circuit to ground being completed through a resistor 19 whose purpose is described below.

The winding 21a of a relay 21 having normally closed contacts 22 is energized in multiple with the starting series field 9. Relay 21 is of the fast acting type and its contacts 22 open before the contacts 16 of contactor 11 can close. The contacts 22 of relay 21 are serially included in a circuit which connects the operating winding 11a of contactor 11 directly in multiple with armature 6, the voltage drop across armature 6 being small until the motor comes up to speed and develops counter electromotive force. As the motor comes up to speed, the voltage drop across the starting series field 9 decreases and relay 21, whose operating winding 21a is connected in multiple therewith, releases when the magnitude of this voltage drop becomes sufficiently low.

The release of relay 21 closes its normally closed contacts 22 completing a circuit to the operating winding 11a of contactor 11 directly in multiple with armature 6. If the motor has attained a suitable speed or when it reaches such a speed, there will be sufficient voltage across armature 6 to operate contactor 11, thereby simultaneously short circuiting both the starting series field 9 and the winding 21a of relay 21. This applies the direct current source directly to the running series field 8 and armature 6 and to the shunt field circuit which includes resistor 19 and shunt field 7. The motor 2 then drives the alternator 1 approximately at correct speed for the desired frequency.

*Voltage regulation*

The stator 4 of alternator 1 has one of its terminals grounded and the other terminal is connected to an output terminal 24, the other output terminal 25 being grounded. Stator 4 is also connected through a transformer 26 which supplies a bridge type rectifier 27 with a voltage suitable for operation of the voltage regulator circuit. A resistor 28 is connected in series with the alternating current input circuit to the rectifier 27 and a capacitor 29 is connected across the alternating current input terminals for improvement of the voltage response characteristics of the rectifier 27, and to reduce the harmonics which would otherwise be present in the rectifier output. The output of rectifier 27 is applied to a voltage divider comprising a fixed resistor 30 and a potentiometer 31. A filter capacitor 32 is connected across the direct current output terminals of the rectifier 27 and one of these terminals is grounded. A direct current potential to ground is therefore applied to conductor 33, its magnitude being adjustable by manipulation of potentiometer 31. The magnitude of this potential will vary with the output voltage of the alternator 1.

A source of fixed reference potential is provided, being indicated illustratively as a battery 34. In practice, however, this may take any desired form such as a circuit including a gaseous discharge regulator tube.

The variable potential from conductor 33 and the fixed reference potential from source 34 are differentially applied to a magnetic amplifier designated generally as 35. The amplifier 35 comprises two saturable toroidal cores 36 and 37 which have serially connected control windings 38 and 39 respectively, wound thereon. The saturable cores 36 and 37 are preferably made of a heat treated alloy consisting of about 50% nickel and about 50% iron. This alloy is treated to provide an oriented grain stucture and the cores are built up from suitably formed laminations. The magnetic properties of this material are characterized by a substantially rectangular hysteresis loop and it is commercially available under the trade name "Deltamax."

The varying potential derived from the output of alternator 1 is shown connected from conductor 33 to control winding 39 and the reference source of fixed potential 34 is connected to control winding 38. Potentiometer 31 is so adjusted that at the normal or correct output voltage from alternator 1, no current flows through the control windings 38 and 39 of amplifier 35.

The saturable cores 36 and 37 also have wound thereon the serially connected amplifier output windings 40 and 41 respectively. Output winding 40 is connected through a half-wave rectifier 42 and conductor 43 to one side of the secondary winding 44 of a transformer 45. The other output winding 41 is similarly connected via conductor 43 to the secondary winding 44 of transformer 45 through half-wave rectifier 46 which is poled oppositely to rectifier 42. Half-waves of one polarity will thus be applied to output winding 40 and half waves of the opposite polarity will be applied to output winding 41.

The current flow in each of the output windings 40 and 41 is thus of a half-wave or pulsating direct current character. These two currents are combined at the connection between windings 40 and 41 and the resulting full-wave alternating current is applied to the alternating current input terminals of a bridge type rectifier 47, circuit to the secondary winding 44 of transformer 45 being completed via a conductor 48.

The amplifier input windings 38 and 39 are so poled with respect to the output windings 40 and 41, that current flow in one direction through the input windings produces a flux in the same direction as the half-wave current in the output windings 40 and 41 in both of the saturable cores 36 and 37. Current flow in this direction tends to aid saturation of the cores 36 and 37, and the half-wave impedance of the windings 40 and 41 is thereby decreased thereby increasing the input to the bridge type rectifier 47. It follows that current flow in the opposite direction in the input windings will increase the half-wave impedance of the output windings, thereby decreasing the input to the bridge type rectifier 47.

One terminal of the field winding 3 of alternator 1 is connected to ground through a resistor 49, the other side being connected to the positive terminal of the direct current input via the conductor 15 which is energized through the contacts 13 of contactor 10. This produces a normal field excitation in alternator 1. The positive terminal of the bridge type rectifier 47 is also connected to the positive terminal of the direct current input via conductor 15, and the negative terminal is connected to the low potential side of the alternator field winding 3 via conductor 50. Since the output of the bridge rectifier 47 is of the same polarity as the d. c. line, which is connected to field winding 3 through resistor 49, these two sources are in parallel and their effect on the field current is additive. Therefore, any increase in output voltage of the bridge rectifier will cause an increased current flow in field winding 3, thereby increasing the alternator output voltage. The polarities of the input windings 38 and 39 are so arranged that an increase in generator voltage tends to produce a decrease in field excitation. By proper dimensioning of the circuit characteristics, accurate voltage regulation may be obtained.

*Frequency regulation*

The frequency regulating circuit includes a frequency error sensing means 51 having input terminals 52 connected to the output winding 4 of the alternator 1, and output terminals 53 connected to a magnetic amplifier 54.

The frequency error sensing means 51 comprises a frequency standard, such as a resonant circuit including an inductor and a capacitor, these circuit elements being advantageously maintained at constant temperature to prevent variations in their resonant frequency. Means are further included in the device 51 to convert any deviation from a fixed predetermined frequency, such as the resonance frequency of a tuned circuit, into a unidirectional control signal whose polarity depends upon the direction of deviation of the generator frequency from the predetermined frequency, and whose magnitude is roughly proportional to the magnitude of such deviation. While many various types of frequency error sensing means may have these characteristics, one such device suitable for use as device 51 in the present invention is disclosed in the application of Charles B. Grady, Jr., for Frequency Error Sensing Means, Serial No. 286,587, filed May 7, 1952. The input terminals 52 of device 51 correspond to the input terminals 11 in Fig. 2 of the said application. The output terminals 53 of device 51 correspond to the output terminals 28 and 29 shown in the said Fig. 2.

Magnetic amplifier 54 comprises two saturable toroidal cores 55 and 56 similar to the cores 36 and 37 of amplifier 35 described above. Upon these cores 55 and 56, are wound the serially connected control windings 57 and 58 respectively. Output windings 59 and 60 are also wound upon the saturable cores 55 and 56 respectively. Insofar as the control windings 57 and 58 operate to control the magnitude of the current delivered from the output windings 59 and 60, the operation of magnetic amplifier 54 is the same as that of the magnetic amplifier 35 described above.

The magnetic amplifier 54, however, is shown provided with three additional input or control circuits. One of these circuits is arranged to compensate for frequency changes caused by temperature changes. Another amplifier control circuit is connected to compensate for frequency changes which tend to take place with changes in the load connected to the output of alternator 1 at terminals 24 and 25. The third additional control circuit is a degenerative feed-back circuit for stabilizing the operation of the regulator.

The temperature compensation control circuit comprises two resistors 61 and 62. Resistor 61 has an extremely low temperature coefficient of resistance, so that its resistance remains substantially constant throughout a wide range of temperature variation.

Resistor 62 has a high temperature coefficient of resistance so selected that its resistance varies with temperature at a predetermined rate, generally according to the temperature-speed characteristics of the motor 2. This rate may be adjusted by incorporating a resistor of larger temperature coefficient than that desired, in a network with other resistors of smaller temperature coefficient, the internal circuit of the network being designed and connected to provide the desired overall resistance value and temperature coefficient. This allows the use of available standard materials in the resistors which are combined to produce the resitsance 62.

The circuit of the constant resistor 61 is grounded at one end and extends through a control winding 63 wound on saturable core 55 and a control winding 64 wound on saturable core 56 through resistor 61 to conductor 15. As described above, conductor 15 is connected to one side of the direct current input, when motor 2 is in operation, through the closed contacts 13 of contactor 10.

The circuit of the temperature responsive resistor 62 is grounded at one end, and extends through a control winding 65 wound on saturable core 55 and a control winding 66 wound on saturable core 56 through the temperature responsive resistor 62 to conductor 15. Its circuit is thus similar to that of constant resistor 61.

The control windings 63 and 65 on core 55 are connected in opposing relationship and the control windings 64 and 66 on core 56 are likewise connected in opposing relationship, all of the control windings 63 to 66 being wound with the same number of turns. Moreover, the resistance values of constant resistor 61 and of temperature responsive resistor 62 are so dimensioned that they are equal at a normal room temperature of 20° C. Accordingly, at normal room temperature, the current flow through the circuit of constant resistor 61 is equal to the current flow through the temperature responsive resistor 62, thereby producing no net magnetic effect in the oppositely poled serially connected control windings 63—64 and 65—66 with respect to the saturable cores 55 and 56 of the magnetic amplifier 54.

In the event of a change in temperature, as when the motor 2 is first started and the apparatus gradually warms up in the course of its continued operation, the current flow through the temperature responsive resistor 62 will gradually be materially decreased with respect to the current flow through the constant resistor 61, assuming the temperature coefficient of resistance of temperature variable resistor 62 to be positive. If material having a negative temperature coefficient of resistivity is used in resistor 62, the current will increase from its value under initial starting conditions. In either case, the control windings 63—64 and 65—66 are so poled with respect to the cores 55 and 56 that the shunt field current of motor 2 is initially reduced to an extent tending to offset the otherwise increased field current which would flow as a result of the reduced initial resistance of the copper wire ordinarily used in the shunt field winding 7. The effects of temperature changes of other circuit components are also compensated by the temperature responsive resistor 62, the circuit being specifically designed to obtain this desirable effect by suitable proportioning of the value of the temperature variable resistor 62. If desired, the temperature responsive resistor 62 may comprise a plurality of individual resistors disposed in various locations within and about the apparatus to effect a more accurate temperature compensation.

The load-frequency compensating circuit comprises a control winding 67 wound on saturable core 55 which is connected in series with another control winding 68 wound on saturable core 56, the winding 67 being connected to one side of the running series field 8 of motor 2 via a conductor 69, and the winding 68 being connected to the other side of the running series field 8 by another conductor 70. The windings 67—68 are of relatively few turns and low resistance, and a current flows through these windings which is generally proportional to the current input to the armature circuit of the motor 2. Changes in the load connected to the alternator 1 will cause corresponding changes in the mechanical load driven by motor 2, thereby tending to change its speed and the resulting output frequency of alternator 1. The changes in mechanical load driven by motor 2 are accompanied by corresponding changes in armature input current, and to a certain extent these changes in speed are compensated by the running series field 8. Further compensation is provided by the compensating circuit comprising the control windings 67—68 of magnetic amplifier 54.

The degenerative feed back circuit for stabilizing the operation of the regulator with respect to frequency changes comprises a control winding 71 wound on saturable core 55 and a control winding 72 wound on saturable core 56, the two control windings being connected in series. These series connected control windings 71—72 are connected through a capacitor 73 to the direct current output terminals of a bridge type rectifier 74. Changes in the output voltage of the bridge type rectifier 74 will produce a transitory current flow through the capacitor 73 and the control windings 71—72, these control windings being degeneratively poled so that an otherwise rapid change in the output voltage of rectifier 74 is counteracted by the transient current flow through the control windings 71—72. Under steady state conditions, the control windings 71—72 are ineffective.

The operation of magnetic amplifier 55 in controlling the output voltage of rectifier 74 is otherwise the same as that of magnetic amplifier 35 described above in connection with the voltage regulating portion of the regulator. The half-wave rectifiers 75 and 76 are connected to the output windings 59 and 60, respectively. A transformer 77 is energized from the stator 4 of alternator 1 and has a secondary winding 78 connected to the junction between the half-wave rectifiers 75 and 76. The common connection between the output windings 59 and 60 of magnetic amplifier 54 is connected to one of the alternating current input terminals of the bridge type rectifier 74, the other alternating current input terminal of rectifier 74 being connected directly to the secondary winding 78 of transformer 77 via a conductor 80. The magnetic amplifier 54 thus controls the output of the bridge type rectifier 74.

The positive output terminal of rectifier 74 is connected to conductor 15 and thence through the contacts 13 of contactor 10, which are closed during operation of the inverter, to the positive side of the direct current input at terminal 14. The negative side of the output of rectifier 74 is connected via a conductor 81 to the junction between the shunt field 7 of motor 2 and the resistor 19, the other end of resistor 19 being grounded.

Thus, an increase in the output of rectifier 74 increases the current flow through shunt field 7, thereby decreasing the speed of the motor 2, and decreasing the output frequency of the alternator 1.

In operation, the frequency error sensing means applies a control potential from its output terminals to the control windings 57—58 of magnetic amplifier 54 which is intended to provide an accurate steady state output frequency from the alternator 1, and to compensate with precision for slow drifts in frequency. The load-frequency compensating circuit comprising the control windings 67—68 is designed to compensate for rapid changes in load and thus anticipate changes in frequency before they require correction by the frequency error sensing means 51. The temperature responsive control circuit comprising the control windings 63—64 and 65—66 is intended to relieve the frequency error sensing means of the necessity for making frequency corrections due to temperature changes. This results in a smaller maximum range of control potential being required from the frequency error sensing means, and hence simplifies its design with a view to increasing its precision.

Since the speed of motor 2 is maintained at a constant value by the frequency regulating portion of the regulator, the burden on the voltage regulating portion is greatly reduced, being limited to compensation for internal voltage drops within the stator 4 of alternator 1.

Having thus described my invention, I claim:

1. A frequency regulator for controlling the output frequency of an alternator driven by a direct current motor, said direct current motor having a field adapted for energization in varying degree for controlling the frequency of said alternator output, said regulator comprising: frequency error sensing means connected to said alternator output and producing a control potential; magnetic amplifying means having a plurality of inputs and an output connected to vary the degree of energization of said motor field, one of said inputs being connected for response to said control potential; and circuit means connecting another of said inputs degeneratively across said motor field for stabilizing the operation of said regulator.

2. A regulator according to claim 1, wherein said circuit means connecting said other of said inputs degeneratively to said field includes a capacitor connected to block the continuous flow of direct current through said input.

3. A regulator according to claim 1, further comprising a circuit comprising a resistor having an appreciable temperature coefficient of resistance connected to another of said inputs.

4. A frequency regulator for controlling the output frequency of an alternator driven by a direct current motor, said direct current motor having a field adapted for energization in varying degree for controlling the frequency of said alternator output, said regulator comprising: frequency error sensing means connected to said alternator output and producing a unidirectional control potential whose direction varies with the direction of deviation of said frequency from a fixed predetermined value and whose magnitude varies in accordance with the magnitude of such deviation; and magnetic amplifying means adapted to amplify unidirectional currents having an output connected to vary the degree of energization of said motor field, said amplifying means having at least two inputs, one of said inputs being connected for response to said control potential, and another of said inputs being degeneratively connected across said field for stabilizing the operation of said regulator whereby said output frequency remains substantially constant.

5. A frequency regulator for controlling the output frequency of an alternator driven by a direct current motor, said direct current motor having an armature for driving said alternator, a field adapted for energization in varying degree for controlling the speed of said motor armature, and a series field connected in series with said armature, said regulator comprising: frequency error sensing means connected to the output of said alternator, said error sensing means producing a unidirectional control potential the direction of which varies in accordance with the direction of deviation of said frequency from a fixed predetermined value and the magnitude of which varies in accordance with the magnitude of such deviation; and smoothly and continuously responsive control means having a first input connected to said error sensing means for response to said control potential and a second input connected to said armature circuit for energization in accordance with the potential drop across said series field, said control means having an output connected to vary the degree of energization of said first-named motor field, the polarities of each of said input connections being arranged to tend to maintain the speed of said motor armature at a fixed predetermined value.

6. A frequency regulator for controlling the output of an alternator driven by a direct current motor, said direct current motor having an armature for driving said alternator, and a field adapted for energization in varying degree for controlling the speed of said motor armature, said regulator comprising: frequency error sensing means connected to the output of said alternator, said error sensing means producing a unidirectional control potential the direction of which varies in accordance with the direction of deviation of said frequency from a fixed predetermined value and the magnitude of which varies in accordance with the magnitude of such deviation; circuit means including a resistor having a high temperature coefficient of resistance, said resistor being disposed in proximity to said motor to vary in temperature along therewith; means for deriving a further control signal from said circuit means; and continuously responsive control means having a first input connected to said error sensing means for response to said first-named control potential thereof, a second input connected to said deriving means for response to said further control signal and an output connected to vary the degree of energization of said motor field, the polarities of each of said input connections tending to maintain the speed of said motor armature at a fixed predetermined value, said further control potential tending to counteract speed variations of said motor which would otherwise occur as a result of said temperature variations.

7. A regulator according to claim 5, further comprising a circuit including a resistor having a high temperature coefficient of resistance and so disposed with respect to said motor and said control means as to vary in temperature along therewith; and wherein said control means has a third input connected to said circuit including said resistor, said input connection being disposed to tend to counteract speed variations of said motor which would otherwise occur as a result of said temperature variations.

8. A regulator according to claim 6, wherein said control means is provided with a third input, said regulator further comprising additional circuit means degeneratively connecting said motor field to said third input for stabilizing the operation of said regulator, said additional circuit means comprising means for preventing the continuous flow of direct current therethrough.

9. A voltage and frequency regulator for controlling the output voltage and frequency of the alternating current output of a rotary inverter, said inverter comprising an armature adapted to be energized from a direct current source, a first winding adapted for energization in varying degree for changing the speed of said armature to control the frequency of said alternating current output, and a second field winding adapted for energization in varying degree for controlling the magnitude of the voltage of said alternating current output, said regulator comprising: frequency error sensing means connected to said alternating current output and producing a unidirectional control potential whose direction varies with the direction of deviation of said frequency from a fixed predetermined value and whose magnitude varies in accordance with the magnitude of such deviation; a first magnetic amplifying means comprising two saturable cores, a first control winding on each core connected to said error sensing means, a second control winding on each core, an output winding on each core, half-wave rectifier means connected to energize each output winding from a common source of alternating current with half-waves of opposite polarity, and a full wave rectifying means connected for energization by the combined outputs of the two output windings; circuit means connecting said first field winding to said full wave rectifying means to vary the degree of energization thereof; a circuit including means for blocking the flow of direct current therethrough connecting both of said second control windings degeneratively to said full wave rectifying means; potential rectifying means connected to said alternating current output; a unidirectional reference potential source; a second magnetic amplifying means comprising two saturable cores, a control winding on each core, said control windings being differentially connected to said potential rectifying means and said reference potential source, an output winding on each core, half-wave rectifier means connected to energize each output winding from a common source of alternating current with half-waves of opposite polarity, and full wave rectifying means connected for energization by the combined outputs of the two output windings; and further circuit means connecting said full wave rectifying means of said second magnetic amplifying means to said second field winding to vary the degree of energization thereof.

10. A regulator according to claim 9, in which said first magnetic amplifying means additionally comprises a further control winding on each core, said further windings being connected to the circuit of said armature for energization therefrom to an extent determined by the magnitude of the current flow in said armature circuit.

11. A regulator according to claim 9 wherein one of said magnetic amplifying means additionally comprises a further control winding on each core, said further windings being connected to a circuit including a resistor having a substantial temperature coefficient of resistance.

References Cited in the file of this patent

UNITED STATES PATENTS

| | | |
|---|---|---|
| 2,610,315 | McKendry et al. | Sept. 9, 1952 |
| 2,631,268 | Ransom et al. | Mar. 10, 1953 |
| 2,632,145 | Sikorra | Mar. 17, 1953 |
| 2,636,150 | McKenney et al. | Apr. 21, 1953 |
| 2,692,366 | Ransom et al. | Oct. 19, 1954 |